United States Patent [19]
Barksby et al.

[11] Patent Number: 5,677,413
[45] Date of Patent: Oct. 14, 1997

[54] POLYURETHANE ELASTOMERS EXHIBITING IMPROVED DEMOLD GREEN STRENGTH AND WATER ABSORPTION AND HAZE-FREE POLYOLS SUITABLE FOR THEIR PREPARATION

[75] Inventors: Nigel Barksby, Dunbar; Stephen D. Seneker, Sissonville, both of W. Va.

[73] Assignee: ARCO Chemical Technology, L.P., Greenville, Del.

[21] Appl. No.: 490,828

[22] Filed: Jun. 15, 1995

[51] Int. Cl.$^6$ .................................................. C08G 18/10
[52] U.S. Cl. .................. 528/65; 252/182.22; 528/76; 528/77; 521/59; 521/176; 521/914; 560/27
[58] Field of Search .................. 252/182.22; 528/65, 528/76, 77; 521/159, 176, 914; 560/27

[56] References Cited

U.S. PATENT DOCUMENTS

| | | | |
|---|---|---|---|
| 4,239,879 | 12/1980 | Fabris et al. | 528/76 |
| 4,243,760 | 1/1981 | McDaniel et al. | 521/176 |
| 4,379,904 | 4/1983 | Ehrlich | 528/65 |
| 5,096,993 | 3/1992 | Smith | 528/61 |
| 5,100,997 | 3/1992 | Reisch et al. | 528/60 |
| 5,106,874 | 4/1992 | Porter et al. | 528/64 |
| 5,116,931 | 5/1992 | Reisch et al. | 528/59 |
| 5,124,425 | 6/1992 | Higuchi et al. | 528/59 |
| 5,158,922 | 10/1992 | Hinney et al. | 502/175 |
| 5,185,420 | 2/1993 | Smith et al. | 528/61 |
| 5,482,908 | 1/1996 | Le-Khanc | 502/156 |

OTHER PUBLICATIONS

J.W. Reisch et al., "Polyurethane Sealants and Cast Elastomers With Superior Physical Properties," 33rd Annual Polyurethane Marketing Conference, Sep. 30 – Oct. 3, 1990, pp. 368–374.

C.P. Smith et al.,"Thermoplastic Polyurethane Elastomers Made From High Molecular Weight Poly-L™ Polyohs" Polyurethane World Congress 1991, Sep. 24–26, 1991, pp. 313–318.

*Primary Examiner*—Rachel Gorr
*Attorney, Agent, or Firm*—Jonathan L. Schuchardt

[57] ABSTRACT

Polyurethane elastomers exhibiting improved green strength while maintaining short demold times are prepared from ultra-low unsaturation polyoxypropylene polyols containing up to 20 weight percent internal random oxyethylene moieties. The elastomers adsorb less than 10 weight percent water at 0° C. The internal polyoxyethylene moiety-containing polyoxypropylene polyols may be used to prepare ultra-low unsaturation polyoxyethylene capped polyols which are haze-free and which may be used to prepare haze-free 4,4'-MDI prepolymers. Multidisperse blends of monodisperse internal oxyethylene moiety-containing polyoxypropylene polyols of ultra-low unsaturation provide yet further improvements in elastomer processing.

16 Claims, 2 Drawing Sheets

POLYURETHANE ELASTOMERS EXHIBITING IMPROVED DEMOLD GREEN STRENGTH AND WATER ABSORPTION AND HAZE-FREE POLYOLS SUITABLE FOR THEIR PREPARATION

TECHNICAL FIELD

The present invention pertains to polyurethane elastomers and to haze-free, ultra-low unsaturation polyoxypropylene/polyoxyethylene polyols suitable for their preparation. More particularly, the subject invention pertains to polyurethane elastomers having improved demold and green strength while exhibiting low water absorption, and further, to polyoxypropylene polyols having random internal oxyethylene moieties suitable for preparing these elastomers. Surprisingly, polyoxyethylene-capped polyoxypropylene polyols containing random oxyethylene moieties do not develop haze upon storage, nor do 4,4'-methylenediphenylene diisocyanate based, isocyanate terminated prepolymers prepared from them.

BACKGROUND ART

Processing characteristics are critical in assessing the commercial viability of polyurethane elastomers. Examples of these processing characteristics are the pot life, gel time, demold time, and green strength, among others. A commercially useful pot life is necessary to enable sufficient working time to mix and degas, where necessary, the reactive polyurethane forming components. Gel time is critical in enabling complete filling of molds before gelation occurs, particularly when large, complex molds are utilized, while demold time is important in maximizing part production. Too long a demold time necessitates larger numbers of relatively expensive molds for a given part output. Demold time is especially critical for glycol extended elastomers which tend to be slow curing. These requirements are often competing. For example, a decrease in catalyst level will generally result in longer pot life and increased gel time, but will often render demold time unsatisfactory, and vice versa.

Green strength is also important. Green strength is a partially subjective measure of the durability of a polyurethane part immediately following demold. The characteristics of the polyurethane forming reaction is such that full strength of the polyurethane part does not develop for a considerable time after casting. The partially cured, or "green" part must nevertheless be demolded within a reasonable time. Polyurethane parts typically display two types of "poor" green strength. One type is such that the part is gelled and rigid, but is brittle and easily torn. Those normally skilled in the art of polyurethane elastomers refer to this type of poor green strength as "cheesy" in reference to its "cheese-like" consistency. The other type of "poor" green strength is when the part is soft and pliable, and permanently distorts during the demolding process. By contrast, parts which upon demold display durability and which can be twisted or bent without permanent damage are said to possess "excellent" green strength. While demold time limits production, poor green strength increases scrap rate.

Various methods of increasing green strength and decreasing demold time have been examined. Increasing catalyst level, for example, may often desirably influence these properties. However, as previously stated, increased catalyst levels also decrease both pot life and gel time. Moreover, when microcellular elastomers are to be produced, some catalysts increase the isocyanate/water reaction to a greater degree than the isocyanate/polyol reaction, and thus can affect processability.

It is well known in the art that polyurea and polyurethane/urea elastomers are much easier to process than all urethane elastomers. Polyurea and polyurethane/urea elastomers are prepared using amine-terminated polyols and/or diamine chain extenders. The most common urethane/urea elastomer system uses a toluene diisocyanate prepolymer reacted with the diamine extender, methylene-bis-(2-chloroaniline), better known as MOCA or MBOCA. This system is known to give a long pot life (10 to 20 minutes) with commercially acceptable demold times of less than 60 minutes with excellent green strength. In addition to this, there is minimal sensitivity to changes in processing conditions with this system. However, some of the physical properties of the elastomers containing urea linkages are inferior compared to all urethane elastomers (i.e. softness, tear strength, resilience and hydrolysis resistance).

Water absorption is critical in many polyurethane elastomer applications. For example, polyurethane elastomeric seals which are exposed to aqueous environments may experience seriously diminished physical properties due to plasticization by water or by disruption of the hydrogen bonding between elastomer polymer polar groups. Elastomers used in expansion strips for roadways may swell and extrude from the pavement, necessitating frequent replacement. Shoe soles, particularly those of the cellular and microcellular types common in athletic shoes, may adsorb considerable amounts of water, particularly at lower temperatures. For these reasons, where exposure to water is contemplated, elastomers based on homopolyoxypropylene polyols or polytetramethylene ether glycols (PTMEG) have been used. In such applications, water absorption is only c.a. 2 weight percent at 0° C. and less at higher temperatures.

However, the PTMEG utilized in PTMEG-based elastomers is a much higher cost raw material, and elastomers based on homopolyoxypropylene polyols generally have long demold times and less than optimal green strength. Addition of greater amounts of catalyst, for example tin octoate, can lower demold time and increase green strength, but at the expense of shorter pot life and gel times, as discussed previously.

In U.S. Pat. No. 5,106,874, the use of polyoxypropylene polyols having unsaturations in the range of 0.02 meq/g polyol to 0.04 meq/g polyol are said to lower demold time. However, as shown in our copending U.S. patent application, filed on even date herewith, even at unsaturations as low as 0.010 meq/g, the demold time of glycol extended elastomers is still quite long, with improvement only possible through the use of polyoxypropylene polyols having exceptionally low unsaturation in the range of 0.007 meq/g. Such ultra-low unsaturation polyols are preferably prepared through the use of a substantially amorphous double metal cyanide-t-butyl alcohol (DMC-TBA) catalyst. Greater than two fold improvement in demold time is possible with such polyols, however green strength is still not optimal.

Polyoxypropylene polyols having a 10–40 weight percent oxyethylene cap are known to lower demold time in polyurethane elastomers, at times sacrificing pot life and gel time. The improvement in reactivity is due to the primary hydroxyl termination of such polyols. However, elastomers prepared from such polyols are notoriously water-sensitive, sometimes adsorbing 200 weight percent of water at low temperatures. In U.S. Pat. No. 5,106,874, the use of polyoxyethylene capped polyoxypropylene polyols having low unsaturation, i.e. 0.02 to 0.04 meq/g, is said to reduce the amount of oxyethylene cap necessary to provide the requisite primary hydroxyl content and thus lower water sensitivity. However, no measurement of water absorption was made. Moreover, the systems exemplified are all rigid, diamine extended polyurethane/urea elastomers and not polyurethane elastomers. Similar disclosure with respect to polyols having lower unsaturation but a high degree of oxyethylene cap may be found in U.S. Pat. No. 5,185,420.

Polyoxypropylene polyols, whether homopolymers or copolymers with other alkylene oxides, are generally prepared by base catalyzed oxyalkylation of propylene oxide onto a suitably hydric initiator molecule. During the polymerization, the competing rearrangement of propylene oxide into allylalcohol, as discussed in *Block and Graft Polymerization*, Vol. 2 Ceresa, Ed. John Wiley & Sons, pp. 17–21, introduces monofunctional species at an increasingly higher rate as oxypropylation proceeds. The unsaturation, measured in accordance with ASTM D2849-69, is generally conceded as corresponding to the amount of monofunctional species present, i.e., polyoxypropylene monols. At equivalent weights of 2000, the mol percent of monol may reach as high as 45 to 50 mol percent or more, this creating a practical upper limit to polyoxypropylene polyol molecular weight.

The use of lower temperatures and lower levels of catalyst has been found to reduce the level of unsaturation, but only marginally, and at the expense of greatly increased process time. Use of special catalysts, for example alkaline earth hydroxides and combinations of metal naphthenates and tertiary amines has been used to lower unsaturation. However, these alternative catalysts give only marginal improvements in unsaturation content to the range of 0.02 to 0.04 meq/g from the normal levels of 0.06 to 1.0 meq/g characteristic of base catalysis.

Significant improvement in monol content of polyoxypropylene polyols has been achieved using double metal cyanide.glyme complex catalysts, for example the non-stoichiometric zinc hexacyanocobaltate.glyme catalysts disclosed in U.S. Pat. No. 5,158,922. Through use of such catalysts, polyoxypropylene polyols of much higher molecular weight than previously thought possible have been prepared, for example 10,000 Da polyoxypropylene triols with unsaturations of 0.017 meq/g. J. W. Reish et al., "Polyurethane Sealants and Cast Elastomers With Superior Physical Properties", 33RD ANNUAL POLYURETHANE MARKETING CONFERENCE, Sep. 30–Oct. 3, 1990, pp. 368–374.

Numerous patents have addressed the use of higher molecular weight polyols to prepare polyurethanes. In such cases, the improvements are said to result either solely from the ability to provide higher molecular weight polyols of useful functionality, or additionally, the low monol content, the monol thought to react as "chain-stoppers" during polyurethane addition polymerization. Illustrative examples of such patents are U.S. Pat. No. 5,124,425 (room temperature cure sealants from high molecular weight polyols having less than 0.07 meq/g unsaturation); U.S. Pat. No. 5,100,997 (diamine extended polyurethane/urea elastomers from high molecular weight polyols having less than 0.06 meq/g unsaturation); U.S. Pat. No. 5,116,931 (thermoset elastomers from double metal cyanide catalyzed polyols having less than 0.04 meq/g unsaturation); and U.S. Pat. No. 4,239,879 (elastomers based on high equivalent weight polyols). However, none of these patents address processing characteristics, which are of paramount importance in the cast elastomer industry.

C. P. Smith et al., in "Thermoplastic Polyurethane Elastomers Made From High Molecular Weight Poly-L™ Polyols", POLYURETHANES WORLD CONGRESS 1991, Sep. 24–26, 1991, pp. 313–318, discloses thermoplastic elastomers (TPU) prepared from polyoxyethylene capped polyoxypropylene diols with unsaturation in the range of 0.014–0.018 meq/g. The polyols used were prepared using double metal cyanide.glyme catalysts, and the elastomers showed increased physical properties as compared to elastomers prepared from a conventionally catalyzed diol of 0.08 meq/g unsaturation. Processability is not discussed.

It has been discovered that low unsaturation polyols sometimes produce polyurethanes with anomalous properties. For example, the substitution of a DMC.glyme catalyzed 10,000 Da molecular weight triol for a 6000 Da molecular weight conventionally catalyzed triol produced an elastomer of higher Shore A hardness where one would expect a softer elastomer, whereas substitution of a similarly DMC.glyme catalyzed 6000 Da molecular weight triol for a conventional 6000 Da molecular weight triol showed no increase in hardness. Moreover, butanediol extended elastomers prepared from DMC.glyme catalyzed polyols exhibited demold times of 150 minutes or more, which is commercially unacceptable in cast elastomer applications.

In copending U.S. application Ser. No. 08/152,614, herein incorporated by reference, is disclosed novel double metal cyanide t-butanol (DMC.TBA) complex catalysts prepared by intimate mixing of catalyst reactants. These catalysts lack the crystallinity of DMC.glyme catalysts observed in X-ray diffraction studies, and moreover exhibit threefold to tenfold higher activity in propylene oxide polymerization. It is especially surprising that the unsaturation is lowered to an unprecedented, ultra-low value through use of these catalysts, with measured unsaturations of from 0.003 meq/g to 0.007 meq/g routinely achieved.

While the measurable unsaturation implies an exceptionally low but finite monol content, it is especially surprising that analysis of the product polyols by gel permeation chromatography showed no detectable low molecular weight fraction. The polyols are essentially monodisperse. The virtually complete absence of any low molecular weight monol species renders polyols having ultra-low unsaturation different in kind from even those prepared from DMC.glyme catalysts.

Preparation of polyoxyethylene capped polyoxypropylene polyols using double metal cyanide catalysts has thus far proven unsuccessful. If polymerization onto a double metal cyanide catalyzed polyoxypropylene polyol is attempted without changing the double metal cyanide catalyst to a conventional base catalyst, a complex mixture of highly capped polyoxypropylene polyols and uncapped polyoxypropylene polyols is obtained. While not wishing to be bound to any particular theory, it is believed that oxyethylation occurs at a substantially higher rate than catalyst/substrate transfer in such cases.

However, even polyoxyethylene capped polyoxypropylene polyols obtained from conventional, base catalyzed oxyalkylation of double metal cyanide catalyzed polyoxypropylene polyols unfortunately generate a haze upon storage, which is generally thought to be undesirable. Moreover, isocyanate terminated prepolymers prepared from such polyols and excess 4,4'-methylenediphenylene diisocyanate (4,4'-MDI) also develop a haze, thought to be crystalline 4,4'-MDI. While the effect of polyol haze on polymers prepared from such polyols may be difficult to quantify, MDI crystals in MDI prepolymers may sediment, and thus artificially create a prepolymer with an NCO content which varies with time, temperature, and agitation of the storage tank.

5

OBJECTS OF THE INVENTION

It is an object of the present invention to provide polyurethane elastomers having improved demold and green strength.

It is a further object of the present invention to provide polyurethane elastomers with low water absorption while maintaining commercially feasible processing parameters.

It is still a further object of the present invention to provide haze-free, polyoxyethylene capped, ultra-low unsaturation polyoxypropylene polyols.

It is yet a further object of the invention to provide preciptate-free prepolymers of 4,4'-MDI and ultra-low unsaturation polyoxypropylene/polyoxyethylene polyols.

SUMMARY OF THE INVENTION

It has now been surprisingly discovered that polyurethane elastomers having short demold time and improved green strength can be prepared using ultra-low unsaturation polyoxypropylene polyols having from 1 to about 20 weight percent internal oxyethylene moieties. The elastomers thus prepared exhibit surprisingly low water absorption. It has also been surprisingly discovered that yet further improvement in green strength and demold is possible through the use of polyol blends having multimodal molecular weight distribution coupled with ultra-low unsaturation, and that these same polyols may be used to prepare both haze-free polyoxyethylene capped polyols and precipitate-free 4,4'-MDI prepolymers based on them.

DESCRIPTION OF PREFERRED EMBODIMENTS

Figure 1:
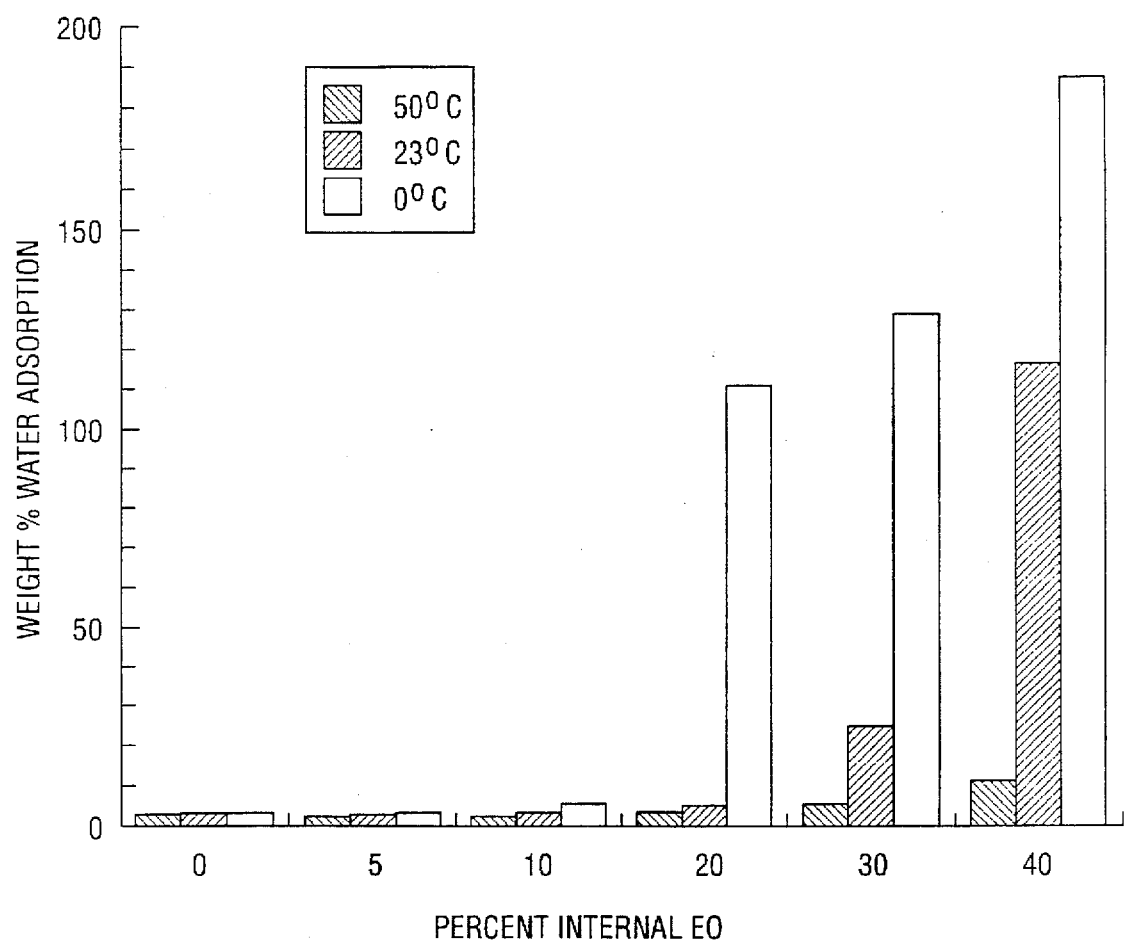
FIG. 1 is a bar graph of water absorption at 0° C., 23° C., and 50° C. of a series of elastomers prepared from polyoxypropylene polyols having ultra-low unsaturation (<0.007 meq/g) containing 0 weight percent to 40 weight percent internal oxyethylene moieties.

The polyurethane elastomers of the subject invention are prepared by the reaction of a di- or polyisocyanate, preferably a diisocyanate, with a polyoxyalkylene polyether polyol mixture by either the prepolymer, one-shot, or other techniques, using diols as chain extenders. While the process of preparing polyurethane elastomers and the raw materials which have been used in the past are well known to those skilled in the art, reference may be had to the following material for purposes of basic reference.

By the term "polyurethane" is meant a polymer whose structure contains predominately urethane

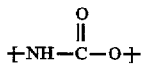

between repeating units. Such linkages are formed by the addition reaction between an organic isocyanate group R—[—NCO] and an organic hydroxyl group [HO—]—R.

6

In order to form a polymer, the organic isocyanate and hydroxyl group-containing compounds must be at least difunctional. However, as modernly understood, the term "polyurethane" is not limited to those polymers containing only urethane linkages, but includes polymers containing minor amounts of allophanate, biuret, carbodiimide, oxazolinyl, isocyanurate, uretidinedione, and urea linkages in addition to urethane. The reactions of isocyanates which lead to these types of linkages are summarized in the POLYURETHANE HANDBOOK, Gunter Oertel, Ed., Hanser Publishers, Munich, ®1985, in Chapter 2, p. 7–41; and in POLYURETHANES: CHEMISTRY AND TECHNOLOGY, J. H. Saunders and K. C. Frisch, Interscience Publishers, New York, 1963, Chapter III, pp. 63–118.

The urethane forming reaction is generally catalyzed. Catalysts useful are well known to those skilled in the art, and many examples may be found for example, in the POLYURETHANE HANDBOOK, Chapter 3, §3.4.1 on pages 90–95; and in POLYURETHANE: CHEMISTRY AND TECHNOLOGY, in Chapter IV, pp. 129–217. Most commonly utilized catalysts are tertiary amines and organotin compounds, particularly dibutyltin diacetate and dibutyltin dilautrate. Combinations of catalysts are often useful also.

In the preparation of polyurethanes, the isocyanate is reacted with the active hydrogen-containing compound(s) in an isocyanate to active hydrogen ratio of from 0.5 to 1 to 10 to 1. The "index" of the composition is defined as the —NCO/active hydrogen ratio multiplied by 100. While the extremely large range described previously may be utilized, most polyurethane processes have indices of from 70 to about 120 or 130, more preferably from 95 to about 110 and most preferably from about 100 to 105. In the case of polyurethanes which also contain significant quantities of isocyanurate groups, indices of greater than 200 and preferably greater than 300 may be used in conjunction with a trimerization catalyst in addition to the usual polyurethane catalysts. In calculating the quantity of active hydrogens present, in general all active hydrogen containing compounds other than non-dissolving solids are taken into account. Thus, the total is inclusive of polyols, chain extenders, functional plasticizers, etc.

Hydroxyl group-containing compounds (polyols) useful in the preparation of polyurethanes are described in the POLYURETHANE HANDBOOK in Chapter 3, §3.1, pages 42–61; and in POLYURETHANES: CHEMISTRY AND TECHNOLOGY in Chapter II, §§III and IV, pages 32–47. Many hydroxyl-group containing compounds may be used, including simple aliphatic glycols, dihydroxyaromatics, particularly the bisphenols, andhydroxyl-terminated polyethers, polyesters, and polyacetals, among others. Extensive lists of suitable polyols may be found in the above references and in many patents, for example in columns 2 and 3 of U.S. Pat. No. 3,652,639; columns 2–6 of U.S. Pat. No. 4,421,872; and columns 4–6 of U.S. Pat. No. 4,310,632; these three patents being hereby incorporated by reference.

Preferably used are hydroxyl-terminated polyoxyalkylene and polyester polyols. The former are generally prepared by well known methods, for example by the base catalyzed addition of an alkylene oxide, preferably ethylene oxide (oxirane), propylene oxide (methyloxirane) or butylene oxide (ethyloxirane) onto an initiator molecule containing on the average two or more active hydrogens. Examples of preferred initiator molecules are dihydric initiators such as ethylene glycol, 1,6-hexanediol, hydroquinone, resorcinol, the bisphenols, aniline and other aromatic monoamines, aliphatic monoamines, and monoesters of glycerine; trihydric initiators such as glycerine, trimethylolpropane, trimethylolethane, N-alkylphenylenediamines, mono-, di-, and trialkanolamines; tetrahydric initiators such as ethylene diamine, propylenediamine, 2,4'-, 2,2'-, and 4,4'-methylenedianiline, toluenediamine, and pentaerythritol; pentahydric initiators such as diethylenetriamine and α-methylglucoside; and hexahydric and octahydric initiators such as sorbitol and sucrose.

Addition of alkylene oxide to the initiator molecules may take place simultaneously or sequentially when more than one alkylene oxide is used, resulting in block, random, and block-random polyoxyalkylene polyethers. The number of hydroxyl groups will generally be equal to the number of active hydrogens in the initiator molecule. Processes for preparing such polyethers are described both in the POLYURETHANE HANDBOOK and POLYURETHANES: CHEMISTRY AND TECHNOLOGY as well as in many patents, for example U.S. Pat. Nos. 1,922,451; 2,674,619; 1,922,459; 3,190,927; and 3,346,557. Preferable are polyether polyols having exceptionally low levels of unsaturation, prepared using double metal cyanide complex catalysts as described infra.

Polyester polyols also represent preferred polyurethane-forming reactants. Such polyesters are well known in the art and are prepared simply by polymerizing polycarboxylic acids or their derivatives, for example their acid chlorides or anhydrides, with a polyol. Numerous polycarboxylic acids are suitable, for example malonic acid, citric acid, succinic acid, glutaric acid, adipic acid, pimelic acid, azelaic acid, sebacic acid, maleic acid, fumaric acid, terephthalic acid, and phthalic acid. Numerous polyols are suitable, for example the various aliphatic glycols, trimethylolpropane and trimethylolethane, α-methylglucoside, and sorbitol. Also suitable are low molecular weight polyoxyalkylene glycols such as polyoxyethylene glycol, polyoxypropylene glycol, and block and heteric polyoxyethylene-polyoxypropylene glycols. These lists of dicarboxylic acids and polyols are illustrative only, and not limiting. An excess of polyol should be used to ensure hydroxyl termination, although carboxy groups are also reactive with isocyanates. Methods of preparation of such polyester polyols are given in the POLYURETHANE HANDBOOK and in POLYURETHANES: CHEMISTRY AND TECHNOLOGY.

Also suitable as the polyol are vinyl polymer modified polyols. Such polymer polyols are well known to the art, and are prepared by the in situ polymerization of one or more vinyl monomers, preferably acrylonitrile and/or styrene, in the presence of a polyether or polyester polyol, particularly polyols containing a minor amount of natural or induced unsaturation. Methods of preparing such polymer polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. Nos. 4,524,157; 3,304,273; 3,383,351; 3,523,093; 3,953,393; 3,655,553; and 4,119,586, all of which patents are herein incorporated by reference.

Non-vinyl polymer modified polyols are also preferred, for example those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 μm, preferably less than 10 μm.

Many isocyanates are useful in the preparation of urethanes. Examples of such isocyanates may be found in columns 8 and 9 of U.S. Pat. No. 4,690,956, herein incorporated by reference, and in the POLYURETHANE HANDBOOK, Chapter 3, §3.2, pages 62–73 and POLYURETHANES: CHEMISTRY AND TECHNOLOGY, Chapter II, §II, pages 17–31. Modified isocyanates such as those containing urethane, biuret, urea, allophanate, uretonimine, carbodiimide or isocyanurate linkages are also useful.

Chain extenders may also be useful in the preparation of polyurethanes. Chain extenders are generally considered to be low molecular weight poly-functional compounds or oligomers reactive with the isocyanate group. Aliphatic glycol chain extenders commonly used include ethylene glycol, propylene glycol, 1,4-butanediol, and 1,6-hexanediol, and the like.

Other additives and auxiliaries are commonly used in polyurethanes. These additives include plasticizers, flow control agents, fillers, antioxidants, flame retardants, pigments, dyes, mold release agents, and the like. Many such additives and auxiliary materials are discussed in the POLYURETHANE HANDBOOK in Chapter 3, §3.4, pages 90–109 and in POLYURETHANES: CHEMISTRY AND TECHNOLOGY, Part II, Technology.

Polyurethane microcellular elastomers contain an amount of blowing agent which is inversely proportional to the desired foam density. Blowing agents may be physical (inert) or reactive (chemical) blowing agents. Physical blowing agents are well known to those in the art and include a variety of saturated and unsaturated hydrocarbons having relatively low molecular weights and boiling points. Examples are butane, isobutane, pentane, isopentane, hexane, and heptane. Generally the boiling point is chosen such that the heat of the polyurethane-forming reaction will promote volatilization.

Until recently, the most commonly used physical blowing agents, however, were the halocarbons, particularly the chlorofluorocarbons. Examples are methyl chloride, methylene chloride, trichlorofluoromethane, dichlorodifluoromethane, chlorotrifluoromethane, chlorodifluoromethane, the chlorinated and fluorinated ethanes, and the like. Brominated hydrocarbons may also be useful. Blowing agents are listed in the POLYURETHANE HANDBOOK on page 101. Current research is directed to lowering or eliminating the use of chlorofluorocarbons, and following the Montreal Protocol, great strides have been made to reduce or eliminate completely, the use of chlorofluorocarbon (CFC) blowing agents which exhibit high ozone depletion potential (ODP) and global warming potential (GWP). As a result, many new halogenated blowing agents have been offered commercially. A preferred group are, for example, the highly fluorinated alkanes and cycloalkanes (HFCs) and perfluorinated alkanes and cycloalkanes (PFCs).

Chemical blowing agents are generally low molecular weight species which react with isocyanates to generate carbon dioxide. Water is the only practical chemical blowing agent, producing carbon dioxide in a one-to-one mole ratio based on water added to the foam formulation. Unfortunately, completely water-blown systems have not proven successful in some applications such as rigid insulation, and thus it is still common to use water in conjunction with a physical blowing agent in some cases. Polyurethane high resilience microcellular elastomers are typical all-water blown foams.

Blowing agents which are solids or liquids which decompose to produce gaseous byproducts at elevated temperatures can in theory be useful, but have not achieved commercial success. Air, nitrogen, argon, and carbon dioxide under pressure can also be used in theory, but have not proven commercially viable. Research in such areas continues, particularly in view of the trend away from chlorofluorocarbons.

Polyurethane microcellular elastomers generally require a surfactant to promote uniform cell sizes and prevent foam collapse. Such surfactants are well known to those skilled in the art, and are generally polysiloxanes or polyoxyalkylene polysiloxanes. Such surfactants are described, for example, in the POLYURETHANE HANDBOOK on pages 98–101. Commercial surfactants for these purposes are available from a number of sources, for example from Wacker Chemie, the Union Carbide Corporation, and the Dow-Corning Corporation.

Processes for the preparation of polyurethane microcellular elastomers and the equipment used therefore are well known to those in the art, and are described, for example, in the POLYURETHANE HANDBOOK in Chapter 4, pages 117–160 and in POLYURETHANES: CHEMISTRY AND TECHNOLOGY, Part II, Technology, in Chapter VIII, §§III and IV on pages 7–116 and Chapter VIII, §§III and IV on pages 201–238.

Having now described polyurethane raw materials generally, the polyoxypropylene polyols of the subject invention containing random, internal oxyethylene moieties have unsaturations of less than 0.015 meq/g, preferably less than 0.010 meq/g, and most preferably from 0.001 to 0.007 meq/g. The polyols are preferably prepared utilizing double metal cyanide complex catalysts. Traditional base catalysis using alkali metal or alkaline earth metal hydroxides or alkoxides will not produce polyols with these low levels of unsaturation. Suitable double metal cyanide.glyme catalysts are disclosed in U.S. Pat. No. 5,158,922, which is herein incorporated by reference.

Preferably, however, DMC.TBA catalysts such as those disclosed in copending U.S. patent application Ser. No. 08/156,534 are used. Examples of suitable catalysts are presented hereinafter. Use of the preferred catalysts shows a distinct improvement over the DMC.glyme and other catalysts. Not only is the unsaturation reduced to incredibly low values, but moreover, despite having a measurable unsaturation, gel permeation chromatographic analysis shows no detectable lower molecular weight components. The ultra-low unsaturation polyols are truly monodisperse and different in kind from even DMC.glyme catalyzed polyols which contain from 5–10 mol percent lower molecular weight components, assumedly monol.

The polymerization generally proceeds from a "starter" molecule, most often a polyoxypropylene polyol of relatively low molecular weight, i.e., 200–700 Da. These starter polyols may be prepared by traditional base catalyzed propylene oxide polymerization, as at these relatively low molecular weights the unsaturation produced is relatively low, and will be diluted as polymerization proceeds. Starter polyols in the lower range of molecular weight are preferred.

Following addition of the double metal cyanide catalyst to the starter polyol, propylene oxide is added to a pressure of about 4 psig (0.27 bar). A rapid drop in pressure indicates that the so-called "induction period" characteristic of double metal cyanide catalysts is over and additional alkylene oxide may now be safely added at higher pressure, for example about 40 psig (2.72 bar). The added alkylene oxide may be initially entirely propylene oxide, or may be the desired weight ratio of propylene oxide and ethylene oxide. It is important that the ethylene oxide be added together with propylene oxide as under these conditions ethylene oxide will randomly copolymerize to the same extent as with conventional base catalysis. The resulting polyoxypropylene/polyoxyethylene polyol will have a random oxyethylene distribution in that part of the polymer formed during copolymerization. The amount of ethylene oxide randomly copolymerized will be from about 1 to about 20 weight percent based on the weight of the polyol. If the ethylene oxide content is greater than about 20 weight percent, then the elastomers will exhibit considerable water absorption. Preferably, from 1 to about 15%, more preferably 5 to about 12% internal oxyethylene moieties are contained in the subject polyoxypropylene polyols.

If desired, the polyoxypropylene polyols containing random internal oxyethylene moieties of the subject invention can be capped with ethylene oxide to provide significant amounts of primary hydroxyl groups. When polyoxypropylene homopolymers prepared from double metal cyanide catalysts are capped with ethylene oxide, the resultant capped polyols rapidly develop a haze upon storage, for example within a 3 to 14 day period. It has been surprisingly discovered that oxyethylene capped polyoxypropylene copolymers containing internal oxyethylene moieties are haze-free even after long periods of storage. The amount of internal oxyethylene content must be an amount effective to produce the haze-free characteristic. It has been found that this amount depends upon the weight percent of oxyethylene cap in the finished polyols, with 2.5 weight percent of internal oxyethylene moieties sufficient for a 14% oxyethylene capped polyol, whereas a larger amount, c.a. 6–8% or more is required for a polyol with an 18% oxyethylene cap. The amount of internal oxyethylene moieties which is effective in producing a haze-free polyol may readily be determined by preparing a series of random, internal polyoxypropylene/polyoxyethylene copolymers with varying internal oxyethylene content, and capping with the desired amount of ethylene oxide. The product is then stored at room temperature for a period of about 20 days. The minimum effective amount of internal oxyethylene moieties will be that of the polyol with lower internal oxyethylene content which remains clear.

In preparing polyurethane elastomers, it has been unexpectedly discovered that the use of polyoxypropylene polyols containing about 20 weight percent internal oxyethylene moieties improves green strength as compared to polyoxypropylene homopolymers of the same molecular weight. Hardness and resilience build also, in general, increase more rapidly. These effects are surprising in that the internal oxyethylene moieties do not provide significantly greater amounts of primary hydroxyl group termination which would be expected of oxyethylene capped polyols. The latter would be expected to react faster.

Further improvement in demold and green strength may be achieved by utilizing a multimodal mixture of polyols of different average molecular weight. The polyols prepared by double metal cyanide catalysis, particularly DMC.TBA, have narrow molecular weight distributions. The polydispersity of a polymer or polymer blend may be defined by the ratio of Mw/Mn where Mw is the weight average molecular weight and Mn is the number average molecular weight. The weight average molecular weight is defined as $Mw = \Sigma_i \omega_i M_i$ where $M_i$ is the ith molecular weight and $\omega_i$ is the weight fraction in the total of the ith molecular weight component. The number average molecular weight is defined as $\Sigma_i n_i M_i$ where $M_i$ is defined as above and $n_i$ is the number fraction of the total of the ith molecular weight component. For a theoretically perfect monodisperse polymer where all polymeric species have a single molecular weight, $M_w=M_n$ and the polydispersity $M_w/M_n=1$. In practice, true monodispersity is never achieved, and in the subject application, polymers described as monodisperse have polydispersities less than 2, and often 1.20 or less. The molecular weights reported herein are number average molecular weights.

The term "multidisperse" as used herein indicates a bi- or trimodal, etc. distribution of molecular weights, with each individual distribution being essentially monodisperse. Such multidisperse blends are advantageously prepared by mixing two or more essentially monodisperse polyols, or by introduction of a second portion of the same or different initiator molecule into the polymerization in the presence of a catalyst suitable for preparing an ultra-low unsaturation polyol, but at a later time.

Ultra-low unsaturation polyols may be described as truly monodisperse, as they contain but a monomodal molecular weight distribution which is relatively narrow. The polydispersity, Mw/Mn is often below 1.10, for example. By blending two or more polyoxypropylene polyols of different molecular weights, each containing from 1 to about 20 weight percent internal oxyethylene moieties and being substantially monodisperse as characterized by an unsaturation of less than 0.010 meq/g polyol, or by blending one of such polyoxypropylene polyols containing 1–20% internal oxyethylene moieties with a polyoxypropylene homopolymer polyol having an unsaturation of less than 0.010 meq/g, polyurethane elastomers may be prepared from such blends which exhibit improved demold time and green strength. The polydispersity of the polyol blends is preferably 1.4 or greater. Polydispersities greater than 2.0 are also suitable.

The polydispersities of a blend of two polyols can be calculated using the following equations:

$$Mw_{blend}=Mw_1\alpha_1+Mw_2\alpha_2,$$

$$Mn_{blend}=Mn_1Mn_2/(Mn_1\alpha_2+Mn_2\alpha_1),$$

$$\text{Polydispersity}_{blend}=Mw_{blend}/Mn_{blend},$$

where $Mw_1$ and $Mw_2$ are weight average molecular weights, $Mn_1$ and $Mw_2$ are number average molecular weights, and $\alpha_1$ and $\alpha_2$ are weight fractions of polyols 1 and 2, respectively.

The isocyanates useful in the preparation of the subject elastomers may, in general, be any organic di- or polyisocyanate, whether aliphatic or aromatic. However, preferred isocyanates are the commercially available isocyanates toluene diisocyanate (TDI) and methylenediphenylene diisocyanate (MDI). Toluene diisocyanate is generally used as an 80:20 mixture of 2,4-and 2,6-TDI, although other mixtures such as the commercially available 65:35 mixture as well as the pure isomers are useful as well. Methylenediphenylene diisocyanate may also be used as a mixture of 2,4'-, 2,2'-, and 4,4'-MDI isomers. A wide variety of isomeric mixtures are commercially available. However, most preferable is 4,4'-MDI or this isomer containing only most minor amounts of the 2,4'- and 2,2'-isomers, as the latter may often affect physical properties in a manner not desirable for a particular product.

Modified isocyanates based on TDI and MDI are also useful, and many are commercially available. To increase the storage stability of MDI, for example, small quantities, generally less than one mole of an aliphatic glycol or modest molecular weight polyoxyalkylene glycol or triol may be reacted with 2 moles of diisocyanate to form a urethane modified isocyanate.

Also suitable are the well known carbodiimide, allophanate, uretonimine, biuret, and urea modified isocyanates based on MDI or TDI. Mixtures of diisocyanates and modified diisocyanates may be used as well. Also suitable are aliphatic and cycloaliphatic isocyanates such as 1,6-hexane diisocyanate, isophorone diisocyanate, 2,4- and 2,6-methylcyclohexyl diisocyanate, and 4,4'-dicyclohexylmethane diisocyanate and its isomers, 1,4-bis (2-(2-isocyanato)propyl)benzene, and mixtures of these and other isocyanates.

In general, the isocyanate index of the overall formulation is adjusted to between 70 and 130, preferably 90 and 110, and most preferably about 100. indexes of from 100 to 105 are particularly suitable. Lower indexes generally result in softer products of lower tensile strength and other physical properties, while higher indexes generally result in harder elastomers which require oven cure or cure for long periods at ambient temperatures to develop their final physical properties. Use of isocyanate indexes appreciably above 130, for example 200–300 generally require addition of a trimerization catalyst and result in a crosslinked, less extensible elastomer having considerable polyisocyanurate linkages.

The chain extenders useful in the subject invention elastomers are preferably the aliphatic glycols and polyoxyalkylene glycols with molecular weights up to about 500 Da, preferably less than 300 Da. Aromatic dihydroxy compounds such as hydroquinone, hydroquinone bis(2-hydroxyethyl)ether (HQEE), the bisphenols, and 4,4'-dihydroxybiphenyl may be used as well. The chain extender may be a sole chain extender or mixture. Preferred are ethylene glycol, diethylene glycol, propylene glycol, 1,3-propanediol, 2-methyl-1,3-propanediol, butylene glycol, 1,4-butanediol, 1,6-hexanediol, neopentylglycol, 1,4-dihydroxycyclohexane, 1,4-cyclohexanedimethanol, and the like. Most preferred are ethylene glycol and in particular 1,4-butanediol and 1,6-hexanediol.

Amine chain extenders may also be used, but preferably in most minor amount. The resulting elastomers should be characterized as polyurethane elastomers rather than polyurethane/urea elastomers which have acquired a distinct status in the art. Examples are ethylene diamine and 1,6-hexanediamine, and diethylenetriamine among the aliphatic amine chain extenders. Suitable and preferred aromatic diamine chain extenders are the various toluenediamine isomers and their mixtures, the various methylenediphenylene diamines and their mixtures, and preferably the slower reacting aromatic diamines such as 4,4'-methylene bis(2-chloroaniline) (MOCA) and the sterically hindered alkyl substituted toluenediamines and methylenediphenylene diamines.

In the subject invention elastomers, it is the polyether polyol component which is critical. Polyoxyalkylene polyether blends containing polyoxypropylene polyols having from 1 to less than 20 weight percent internal oxyethylene moieties which exhibit exceptionally low unsaturation must be used. The measured unsaturation (ASTM test method D-2849-69) is most preferably less than 0.010 meq/g for the polyol blend. Furthermore, the individual polyols, regardless of the overall blend unsaturation, must have individual unsaturations of less than 0.015 meq/g. Preferred are polyol blends where the overall unsaturation is less than 0.007 meq/g and no individual polyol has an unsaturation greater than 0.010 meq/g. Most preferred is the use of individual polyols in the blend where each polyol has a measured unsaturation of less than about 0.007 meq/g.

Thus, the major portion of the polyol blend, in order to have an overall unsaturation of less than 0.010 meq/g, must be an essentially monodisperse polyoxypropylene polyol containing from 1 to less than 20 weight percent internal oxyethylene moieties which may be prepared by polymerizing a mixture of propylene oxide and ethylene oxide onto an initiator molecule of suitable functionality in the presence of a catalyst capable of producing this ultra-low level of unsaturation, for example a substantially amorphous double metal cyanide.TBA catalyst such as those prepared as disclosed in copending U.S. application Ser. No. 08/156,534, which is herein incorporated by reference. An example of catalyst preparation is given in Example 1 herein, and an example of polyol preparation in Example 2. It is notable that ultra-low unsaturation polyols are generally monodisperse, i.e. there is no detectable low molecular weight component.

The polyoxypropylene polyols containing internal oxyethylene moieties may also contain other oxyalkylene moieties derived from $C_{3-4}$ alkylene oxides such as oxetane, 1,2-butylene oxide, and 2,3-butylene oxide, as well as minor amounts of higher alkylene oxides. However, it is preferred that the predominate $C_{3-4}$ alkylene oxide be propylene oxide, and most preferred that it be all propylene oxide. By the term "polyoxypropylene" as used herein is meant a polymer whose non-oxyethylene moieties are predominantly propylene oxide-derived.

The random, internal oxyethylene moieties are introduced by copolymerization of ethylene oxide and propylene oxide (optionally in conjunction with any other alkylene oxides) in the presence of a catalyst suitable for preparation of ultra-low unsaturation polyoxyalkylene polyols, preferably a double metal cyanide catalyst, and most preferably a DMC.TBA catalyst as disclosed in copending U.S. application Ser. No. 08/156,534. The amount of internal oxyethylene moieties should be between 1 weight percent and less than 20 weight percent, preferably between 3 weight percent and 15 weight percent, more preferably between 5 weight percent and 12 weight percent, and most preferably between 5 weight percent and 10 weight percent.

The use of the catalysts disclosed in the aforementioned U.S. application Ser. No. 08/156,534 is particularly preferred, as unprecedentedly low unsaturation, on the order of 0.003 to 0.005 meq/g is possible. Moreover, despite the measurable unsaturation, gel permeation chromatography of polyols prepared with such catalysts surprisingly show no detectable lower molecular weight species, i.e., the polyols are essentially monodisperse, having a polydispersity of less than 1.20, and usually c.a. 1.06.

The haze-free polyoxyethylene capped polyoxypropylene polyols containing less than 20 weight percent random internal oxyethylene moieties cannot, in general, be prepared by terminating propylene oxide addition and continuing ethylene oxide addition, as under these circumstances, ethylene oxide polymerization, for reasons not clearly understood, is not uniform. The polyols resulting from attempts at such polymerizations tend to be mixtures containing substantial quantities of uncapped polyoxypropylene polyols containing internal oxyethylene moieties and substantial quantities of highly oxyethylene capped polyols. Thus, the polyoxyethylene capped polyols must be prepared by polymerizing the ethylene oxide-derived cap in the presence of other catalysts, for example traditional alkali metal hydroxide or alkoxide catalysts. For example, from about 0.1 to about 2.0 weight percent sodium or potassium methoxide, preferably 0.1 to 0.5 weight percent, may be added to the reaction mixture following preparation of the backbone polymer. The DMC catalyst need not be removed prior to addition of the basic catalyst. The mixture is then stripped under vacuum to remove water and/or methanol or other alkanol following which ethylene oxide may then be added under conventional conditions. Other methods of polyol preparation are also suitable, providing the ultra-low unsaturation and other required properties are obtained.

The multidisperse polyol blends useful in the subject invention are advantageously prepared by blending two or more ultra-low unsaturation polyols individually having low polydispersity but different molecular weights, to form a multidisperse polyol blend with a polydispersity greater than 1.4. Gel permeation chromatography of such blends demonstrates a bi- or trimodal, etc. molecular weight distribution, with each of the original polyols representing a relatively narrow peak. The polyol blends may comprise two or more polyoxypropylene polyols containing internal oxyethylene moieties; an essentially homopolymeric polyoxypropylene polyol and one or more polyoxypropylene polyols containing internal oxyethylene moieties; an essentially homopolymeric polyoxypropylene polyol and one or more haze-free polyoxyethylene capped polyoxypropylene polyols containing internal oxyethylene moieties; or other suitable combinations.

Preferably, the elastomers are prepared by the prepolymer process, however, the one shot process is useful as well. In the prepolymer process, the polyoxyalkylene polyol mixture is reacted with excess di- or polyisocyanate to form an isocyanate-terminated prepolymer containing from about 1% to about 25% by weight NCO groups, preferably from about 3% to about 12% NCO, more preferably about 4 to about 10% NCO, and most preferably about 6% NCO. Prepolymer preparation may be catalyzed, preferably by tin catalysts such as dibutyltin diacetate and dibutyltin dilaurate, in amounts of from 0.001 to about 5%, more preferably 0.001 to about 1% by weight. The manufacture of prepolymers is within the level of skill in the art. If desired, the prepolymer polyol component may be augmented with hydroxyl-functional polyols other than polyoxyalkylene polyols, for example polyester polyols, polycaprolactone polyols, polytetramethylene ether glycols, and the like.

Following prepolymer formation, the prepolymer is then mixed with a proportion of one or more chain extenders such that the isocyanate index is in the desired range. The prepolymer and chain extender are thoroughly mixed, degassed if necessary, and introduced into the proper mold or, if thermoplastic polyurethanes are desired, reaction extruded and granulated or deposited on a moving belt and subsequently granulated.

Preferred chain extenders are the aliphatic and cycloaliphatic glycols and oligomeric polyoxyalkylene diols. Examples of suitable aliphatic glycol chain extenders are ethylene glycol, diethylene glycol, 1,2-and 1,3-propanediol, 2-methyl-1,3-propanediol, 1,2- and 1,4-butane diol, neopentyl glycol, 1,6- hexanediol, 1,4-cyclohexanediol, 1,4-cyclohexanedimethanol, hydroquinone bis(2-hydroxyethyl) ether, and polyoxyalkylene diols such as polyoxyethyl-ene diols, polyoxypropylene diols, heteric and block polyoxyethylene/polyoxypropylene diols, polytetramethylene ether glycols, and the like, with molecular weights up to about 300 Da. Preferred are ethylene glycol, diethylene glycol, 1,6-hexanediol and 1,4-butanediol, the latter particularly preferred.

The subject elastomers are highly suitable for microcellular elastomers, for example those suitable for use in shoe midsoles. The formulations of such elastomers contain a minor amount of reactive or volatile blowing agent, preferably the former. For example, a typical formulation will contain from about 0.1 to about 1.0 weight percent, preferably from about 0.2 to about 0.4 weight percent water, and have a density of less than 0.8 g/cm$^3$, preferably from 0.15 to 0.5 g/cm$^3$, and most preferably from about 0.2 to about 0.4 g/cm$^3$. Isocyanate terminated prepolymers are generally utilized in such formulations, and have higher NCO content, in general, than the prepolymers used to form non-cellular elastomers. Isocyanate group contents of from 8 to 25 weight percent, more preferably 10 to 22 weight percent, and most preferably 13–15 weight percent are suitable. The formulations are generally crosslinked and diol extended, the crosslinking being provided by employing, in addition to the glycol chain extender, a tri- or higher functional,. low unsaturation polyol in the B-side, optionally also with a low molecular weight crosslinker such as diethanolamine (DEOA). Alternatively, the isocyanate-terminated prepolymer may be prepared from a tri- or higher functional low unsaturation polyol or a mixture of di- and higher functional low unsaturation polyols. Polyols utilized in significant amount in the formulation, whether incorporated into prepolymer or in the B-side, should have unsaturations of 0.015 meq/g or less, preferably 0.010 meq/g or less and the total average unsaturation of all polyol components should also be below 0.010 meq/g.

Having generally described this invention, a further understanding can be obtained by reference to certain specific examples which are provided herein for purposes of illustration only and are not intended to be limiting unless otherwise specified.

EXAMPLE 1

Catalyst Preparation

Preparation of Zinc Hexacyanocobaltate Catalysts by Homogenization With Tert-Butyl Alcohol as the Complexing Agent A double metal cyanide.TBA catalyst is prepared by the method disclosed in copending U.S. application Ser. No. 08/156,534.

Potassium hexacyanocobaltate (8.0 g) is added to deionized water (150 mL) in a beaker, and the mixture is blended with a homogenizer until the solids dissolve. In a second beaker, zinc chloride (20 g) is dissolved in deionized water (30 mL). The aqueous zinc chloride solution is combined with the solution of the cobalt salt using a homogenizer to intimately mix the solutions. Immediately after combining the solutions, a mixture of tert-butyl alcohol (100 mL) and deionized water (100 mL) is added slowly to the suspension of zinc hexacyanocobaltate, and the mixture is homogenized for 10 minutes. The solids are isolated by centrifugation, and are then homogenized for 10 minutes with 250 mL of a 70/30 (v:v) mixture of tert-butyl alcohol and deionized water. The solids are again isolated by centrifugation, and are finally homogenized for 10 minutes with 250 mL of tert-butyl alcohol. The catalyst is isolated by centrifugation, and is dried in a vacuum oven at 50° C. and 30 in. (Hg) to constant weight.

EXAMPLE 2

Preparation of Polyoxypropylene Triol With Random Internal Ethylene Oxide

To a high pressure stainless steel autoclave was charged 7.6 pounds (3.45 Kg) LHT-240, a glycerine-initiated polyoxypropylated triol of nominal 700 Da molecular weight and sufficient catalyst as prepared in Example 1 to provide 100 ppm catalyst in the polyol product. The mixture is stirred and heated to 105° C. under vacuum to remove traces of water from the triol starter, and an initial charge of a mixture of propylene oxide and ethylene oxide (90:10) is added and the reactor pressure monitored carefully. An accelerated pressure drop indicates that the catalyst has become activated. Additional propylene oxide/ethylene oxide is added over a period of approximately 6.5 hours until a total of approximately 57.5 lbs. (26.1 Kg) has been added. The reactor is then stripped with nitrogen at 117° C. under vacuum and the product discharged through a cartridge filter to remove residual catalyst. The resulting polyol is a c.a. 6000 Da triol containing 10 weight percent internal oxyethylene moieties, and having an unsaturation of c.a. 0.004 meq/g.

COMPARATIVE EXAMPLE 3

Preparation of 6000 Da Triol with 14% Polyoxyethylene Cap, No Internal Oxyethylene Moieties To the stainless steel autoclave of Example 2 was added 7.6 lbs. (3.45 Kg) LHT-240 and sufficient catalyst of Example 1 to provide 100 ppm catalyst in the polyol product. The reactor was stirred at 105° C. under vacuum as before, an initial charge of propylene oxide added and the pressure noted. After the catalyst had become activated, a total of 48.3 lbs. (21.9 Kg) propylene oxide was added over a period of 5.5 hours. To the polyoxypropylene homopolymer triol thus obtained was added 332 g of 25 weight percent sodium methoxide in methanol and 2.8 lbs. hexane. Hexane, methanol, and any water present were removed by stripping at 4 psia (0.27 bar) and 117° C. for 1 hour and then for an additional 3 hours at full vacuum. Following stripping, 9.1 lbs. (4.1 Kg) ethylene oxide was added at 117° C. over a period of 1.5 hours. The residual catalysts were then removed by treatment with magnesol and filtration. The resulting product was a c.a. 6000 Da polyoxypropylene triol having a 14 weight percent polyoxyethylene cap, no internal oxyethylene moieties, and an unsaturation of c.a. 0.006 meq/g. The polyol product developed a haze after storage at room temperature for a short period.

EXAMPLE 4

The procedure of Example 3 was followed, except that initial oxyalkylation was with 48.3 lbs. (21.9 Kg) of a propylene oxide/ethylene oxide mixture (93:7) over 6.5 hours at 105° C. Following preparation of the polyoxypropylene triol backbone containing random oxyethylene moieties, 332 g of 25 weight percent sodium methoxide in methanol was added and the autoclave stripped as in Example 3. Then, 9.1 lbs. (4.1 Kg) ethylene oxide was added at 117° C. over 1.5 hours. The catalysts were removed using magnesol treatment and filtration as before. The product was a polyoxypropylene triol containing 5% random internal oxyethylene moieties with a 14 weight percent polyoxyethylene cap, and an unsaturation of c.a. 0.003 meq/g. The product was haze-free even after greater than 60 days of storage.

EXAMPLES 5–8

In a manner similar to that presented in Examples 3 and 4, a series of polyoxypropylene, polyoxyethylene capped diols and triols with and without internal oxyethylene moieties were prepared. The polyols were stored for extended periods at room temperature and examined periodically to defect formation of haze. The results are tabulated in Table 1. Examples 5, 3 and 8 are comparative examples.

TABLE 1

| Example | Mol. Wt. D.a. | Functionality | EO Cap wt. % | Random EO wt. % | Appearance | Days Since[1] Manufacture |
|---|---|---|---|---|---|---|
| 5 | 4000 | diol | 14 | 0 | hazy | — |
| 3 | 6000 | triol | 14 | 0 | hazy | — |
| 6 | 6000 | triol | 14 | 2.5 | clear | 23 |
| 4 | 6000 | triol | 14 | 5 | clear | 60+ |
| 7 | 6000 | triol | 6 | 8 | clear | 60+ |
| 8 | 6000 | triol | 18 | 5 | hazy | — |

[1]Examples 5, 3 and 8 turned hazy from 3–14 days after manufacture.

Table 1 shows that as little as 2.5% internal oxyethylene moieties are sufficient to render a 14% polyoxyethylene capped polyoxypropylene polyol haze-free, while a similar polyol without internal oxyethylene turned rapidly hazy. Table 1 further shows that higher degrees of polyoxyethylene capping will require additional random, internal oxyethylene moieties to render the polyols haze-free. Example 8, with 18% polyoxyethylene cap, was not rendered haze-free by 5 weight percent internal oxyethylene moieties. A higher amount of internal oxyethylene will be required to produce a haze-free polyol in this case.

EXAMPLES 9–14

A series of 4000 Da molecular weight polyoxypropylene diols containing 0, 5, 10, 20, 30 and 40 weight percent internal random ethylene oxide moieties were prepared as in Example 2. The diols were reacted with 4,4'-methylenediphenylene diisocyanate to prepare isocyanate-terminated prepolymers containing 6 weight percent NCO, and extended with 1,4-butanediol to prepare polyurethane elastomers. Dibutyltin dilaurate was used as the polyurethane catalyst; the amount of catalyst was adjusted to give similar pot life in order that demold times and green strength could be subject to proper comparison. Blends of polyoxypropylene homopolymer diols having exceptionally low unsaturation and found to beneficially affect demold time and green strength as disclosed in our copending application filed on even date herewith are also included for purposes of comparison. The results are presented in Table 2. The examples presented in the first column and the last two columns of Table 2 are comparative examples.

weight percent internal random oxyethylene moieties are similar and in some cases superior to elastomers prepared from a monodisperse polyoxypropylene homopolymer diol and multidisperse polyoxypropylene homopolymer blends. However, the green strength at demold is improved over the monodisperse, low unsaturation polyoxypropylene homopolymer, and the tensile strengths of the random oxyethylene-containing elastomers are considerably higher than those prepared from monodisperse or multidisperse polyoxypropylene homopolymer diols. Moreover, the green strength after 60 minutes for the elastomers prepared from polyoxypropylene polyols containing 5 and 10 weight percent internal oxyethylene moieties was excellent, while that of the elastomer prepared from the 4000 Da monodisperse homopolyoxypropylene polyol was average.

The polyoxypropylene polyols of the subject invention, having up to about 20 weight percent internal oxyethylene moieties and ultra-low unsaturation, have been demonstrated to process well in terms of exhibiting commercially useful demold times and good green strength, as well as providing elastomers with superior physical properties. However, as disclosed previously, many elastomers are required to retain their physical properties in wet environments. We have found that polyurethane elastomers prepared from low unsaturation polyoxypropylene polyols having up to about 20 weight percent random oxyethylene moieties surprisingly show minimal room temperature water absorption, and elastomers prepared from polyols containing less than 20 weight percent random internal oxyethylene content, preferably 5–15 weight percent, exhibit water absorption of less than 10 weight percent, and generally less than 5 weight percent, even at 0° C., whereas elastomers

TABLE 2

| POLYOL TYPE | 4000 Da 0% int. EO | 4000 Da 5% int. EO | 4000 Da 10% int. EO | 8000 DA 2000 Da 0% int. EO | 8000 Da 1000 Da 0% int. EO |
|---|---|---|---|---|---|
| Dispersity | Monodisperse | Monodisperse | Monodisperse | Multidisperse | Multidisperse |
| Polyol Unsaturation, meq/g | 0.005 | 0.005 | 0.0038 | 0.005 | 0.005 |
| PROCESSING CHARACTERISTICS | | | | | |
| Pot Life, sec. | 124 | 119 | 129 | 131 | 116 |
| Demold Time, min. | 22 | 25 | 25 | 29 | 25 |
| Green Strength at Demold | poor | average | good | good | good |
| PHYSICAL PROPERTIES | | | | | |
| Hardness, Shore A | 71 | 68 | 70 | 71 | 68 |
| Resilience, % | 68 | 67 | 68 | 66 | 64 |
| Elongation, % | 903 | 842 | 948 | 890 | 867 |
| Tensile Strength, psi | 2960 | 3233 | 3553 | 2764 | 2625 |
| 100% Modulus, psi | 472 | 444 | 448 | 486 | 466 |
| 300% Modulus, psi | 896 | 892 | 847 | 873 | 880 |

As can be seen from the table, the demold times for the polyoxypropylene diols containing 5 weight percent and 10 prepared with 20 weight percent or more internal oxyethylene moieties as well as oxyethylene capped polyoxypropylene polyols show absorptions of greater than 100 weight percent under these conditions. The water absorption at 0° C., 23° C., and 50° C. of elastomers prepared from polyols containing varying amounts of random internal oxyethylene moieties is presented in FIG. 1.

As can be seen from FIG. 1, for elastomers where problems expected with respect to water absorption is limited to higher temperatures, i.e. room temperature or higher, up to 20 weight percent internal oxyethylene moieties are suitable in the polyols used to prepare the elastomers. However, when minimal low temperature water absorption is required, for example low absorption at 0° C., the amount of internal oxyethylene moieties is preferably less than 15 weight percent, more preferably in the range of 5 weight percent to 10 weight percent. Under these conditions, 0° C. water absorption is less than 5% by weight, nearly the same as is obtainable with polyoxypropylene homopolymer polyols and PTMEG polyols but without the processing problems of the former or the higher cost of the latter.

The actual weight percent water absorption of the elastomers is presented in Table 3, along with a comparative elastomer prepared from a 4000 Da, 20 weight percent polyoxyethylene capped polyoxypropylene diol (Example A), having an unsaturation of 0.009 meq/g.

TABLE 3

Weight Percent Water Absorption As A
Function of Temperature (6% MDI Prepolymers/BDO Cured)

| Example | Percent Oxyethylene | Water Immersion Temperature | | |
|---|---|---|---|---|
| | | 50° C. | 23° C. | 0° C. |
| 9 | 0 | 2.1 | 2.1 | 2.2 |
| 10 | 5 | 2.0 | 2.1 | 2.5 |
| 11 | 10 | 2.3 | 2.5 | 4.7 |
| 12 | 20 | 2.3 | 3.9 | 110.4 |
| 13 | 30 | 3.5 | 23.1 | 129.5 |
| 14 | 40 | 10.4 | 116.0 | 189.0 |
| C | 20% capped | 5.1 | 14.2 | 76.4 |

Figure 2:
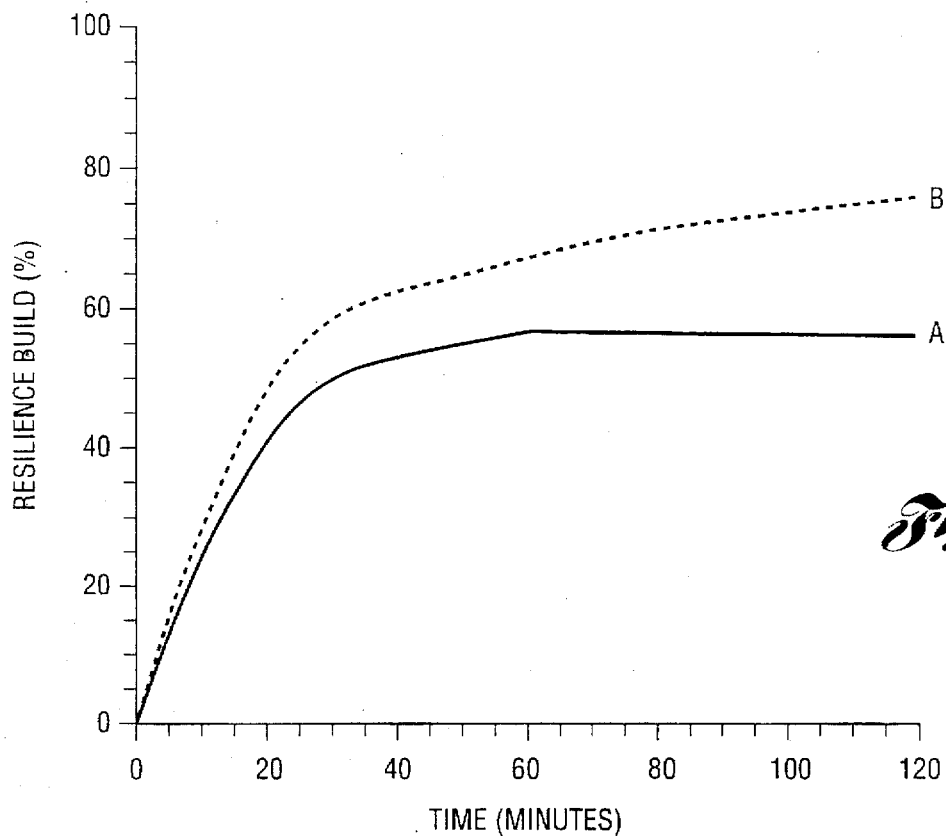
FIG. 2 is a plot of resilience build with time for polyurethane elastomers prepared from two ultra-low unsaturation 4000 Da polyols: a monodisperse polyoxypropylene homopolymer diol, and a monodisperse polyoxypropylene diol containing 10 weight percent internal oxyethylene moieties.
Figure 3:
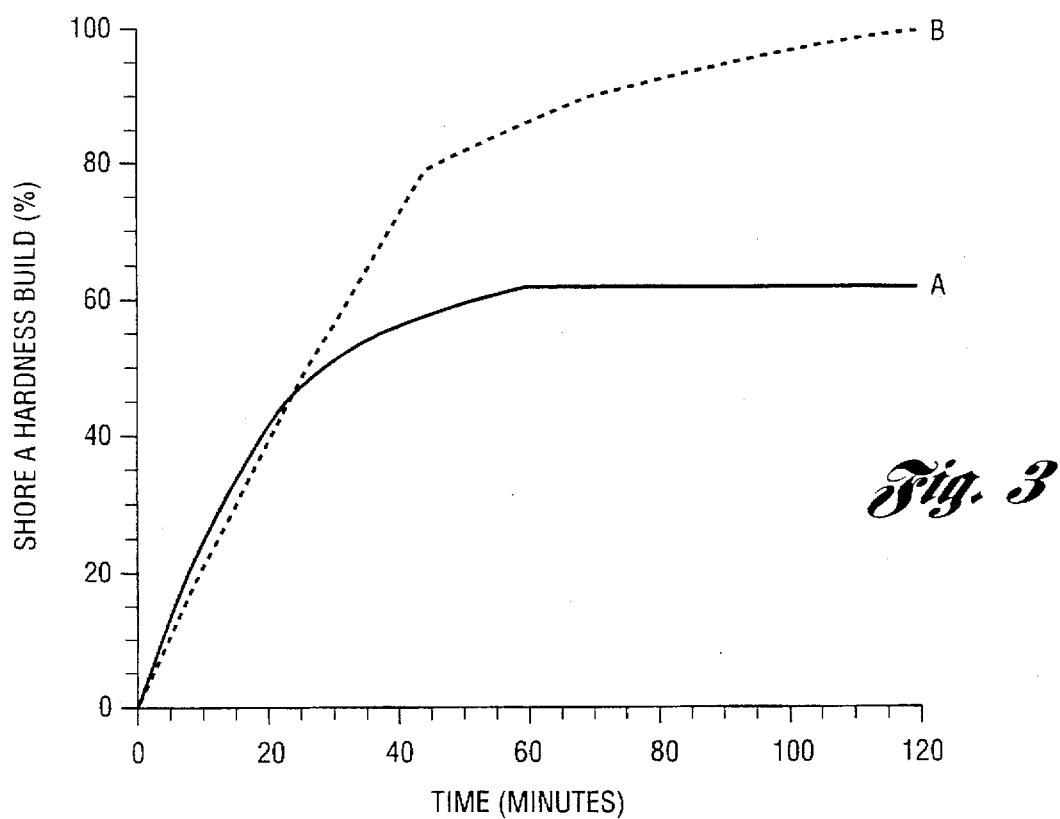
FIG. 3 is a plot of hardness build with time for the same elastomers as in FIG. 2.

The development of hardness and resilience build with respect to time are considerably enhanced with the subject polyols containing internal oxyethylene moieties as compared to polyoxypropylene homopolymer polyols. FIG. 2 shows the resilience build of elastomers prepared from a 4000 Da molecular weight polyoxypropylene homopolymer diol (no internal EO) (Plot A), and a 4000 Da monodisperse polyoxypropylene diol containing 10 weight percent random oxyethylene moieties (Plot B). To measure resilience build, a series of identical elastomers were prepared from the aforementioned polyols and oven cured at 100° C. Elastomers were removed at various intervals and resilience measured. As can be seen, even though the polyoxypropylene diol containing 10 weight percent internal oxyethylene moieties was monodisperse, the resilience build is considerably greater than that achieved from a monodisperse, ultra-low unsaturation polyoxypropylene diol. B Moreover, the physical properties of the elastomers prepared from the diol containing internal oxyethylene moieties are far superior to those of either of the other two examples. The hardness build of the same elastomers is presented in FIG. 3.

While the best mode for carrying out the invention has been described in detail, those familiar with the art to which this invention relates will recognize various alternative designs and embodiments for practicing the invention as defined by the following claims.

What is claimed is:

1. A polyurethane elastomer exhibiting less than 10 weight percent water absorption at 23° C., said elastomer being the reaction product of:
   a) a di- or polyisocyanate at an index of from 70 to about 130;
   b) a polyoxypropylene polyol component having an average equivalent weight of from 1000 Da to about 8000 Da, an average unsaturation of less than about 0.010 meq/g and comprising in major part at least one polyoxypropylene polyol containing from 1 to about 20 weight percent internal random oxyethylene moieties and a nominal functionality of two or three and wherein said at least one polyoxypropylene polyol contains not more than about 20 weight percent total oxyethylene moieties; and
   c) an aliphatic glycol or oligomeric polyoxyalkylene diol chain extender having a molecular weight of less than about 300 Da.

2. The elastomer of claim 1 wherein said polyoxypropylene polyol component comprises a single polyoxypropylene diol having an unsaturation of less than about 0.007 meq/g and an internal random oxyethylene Content of between about 1 weight percent and about 15 weight percent.

3. The elastomer of claim 1 wherein said polyoxypropylene polyol component comprises a multi-disperse polyol component having a polydispersity of at least 1.4 and containing at least two individual substantially monodisperse polyoxypropylene polyols having an unsaturation of less than 0.010 meq/g, at least one of said at least two individual polyoxypropylene polyols containing from 1 weight percent to about 20 weight percent random internal oxyethylene moieties.

4. The elastomer of claim 1 wherein said polyoxypropylene polyol comprises a polyoxypropylene diol or triol having an equivalent weight of from 1000 Da to about 8000 Da, an unsaturation of about 0.007 meq/g or less, and an internal oxyethylene content of 5 to about 12 weight percent based on the weight of the polyoxypropylene diol or triol.

5. A polyurethane elastomer exhibiting less than 10 weight percent water, absorption when measured following immersion in water at 0° C., said elastomer comprising the reaction product of:
   a) an isocyanate terminated prepolymer containing from 3 weight percent to about 25 weight percent NCO having been prepared by the reaction of a di- or polyisocyanate containing in major part 4,4'-methylenediphenylene diisocyanate with a polyoxypropylene polyol component comprising in major part:
      a) i) at least one polyoxypropylene diol or triol having an unsaturation of less than about 0.010 meq/g, a random internal oxyethylene content of from 1 weight percent to about 12 weight percent, and having not more than 20 weight percent total oxyethylene moieties;
      a) ii) optionally, one or more polyoxypropylene diols or triols having an unsaturation less than about 0.010 meq/g and an internal random oxyethylene content of less than 1 weight percent;
   wherein the average equivalent weight of a) i) and a) ii) together is from about 1000 Da to about 8000 Da; with
   b) an aliphatic diol chain extender selected from the group consisting of ethylene glycol, diethylene glycol, neopentyl glycol, 1,4-butanediol, 1,6-hexanediol, and 1,4-cyclohexanedimethanol at an isocyanate index of from 70 to about 130.

6. The elastomer of claim 5 wherein said polyol component a) i) and a) ii) together has a polydispersity of 1.4 or greater.

7. The elastomer of claim 6 wherein each of said polyoxypropylene polyols a) i) and a) ii) are substantially monodisperse, with individual polydispersities of less than about 1.20.

8. The elastomer of claim 5 further comprising the reaction product of water as a reactive blowing agent in an amount of from 0.1 weight percent to about 1 weight percent based on the weight of the total reactive composition such that the resulting elastomer is a microcellular elastomer having a density less than 0.8 g/cm$^3$.

9. The microcellular elastomer of claim 8 wherein the density of said microcellular elastomer is from about 0.2 g/cm$^3$ to about 0.4 g/cm$^3$.

10. The microcellular elastomer of claim 9 wherein the polyurethane polymer comprising said microcellular elastomer exhibits a water absorption of less than 5 weight percent at 0° C.

11. An isocyanate terminated prepolymer free of precipitates prepared by reacting an excess of a di- or polyisocyanate component comprising 4,4'-methylenediphenylene diisocyanate in major part, with a polyoxypropylene polyol containing from 1 to about 20 weight percent internal oxyethylene moieties, not more than about 20 weight percent total oxyethylene moieties, and having an unsaturation less than about 0.015 meq/g.

12. An isocyanate terminated prepolymer free of precipitates prepared by reacting an excess of a di- or polyisocyanate component comprising 4,4'-methylenediphenylene diisocyanate in major part, with a haze-free polyoxyethylene capped polyol having an unsaturation of less than about 0.015 meq/g polyol and comprising a) a di- to octafunctional polyoxypropylene backbone polyol containing from 1 to about 20 weight percent random internal oxyethylene moieties;

b) from about 5 weight percent to about 25 weight percent polyoxyethylene moieties present as a cap onto said backbone polyol;

wherein said backbone polyol is prepared by polymerizing a mixture of propylene oxide and ethylene oxide onto a di- to octafunctional initiator molecule in the presence of a double metal cyanide catalyst;

wherein said haze-free polyoxyethylene capped polyol has an equivalent weight from about 500 Da to about 15,000 Da;

wherein the amount of random internal oxyethylene moieties is such as to prevent the formation of haze in said polyoxyethylene capped polyols for a period of at least 20 days when stored at 23° C.; and wherein all weight percents are relative to the weight of the haze-free polyoxyethylene capped polyol.

13. An isocyanate terminated prepolymer free of haze prepared by reacting an excess of a di- or polyisocyanate component comprising 4,4'-methylenediphenylene diisocyanate in major part, with the haze-free polyoxyethylene capped polyol of claim 12 wherein the unsaturation of said haze-free polyoxyethylene capped polyol is less than about 0.010 meq/g polyol.

14. An isocyanate terminated prepolymer free of haze prepared by reacting an excess of a di- or polyisocyanate component comprising 4,4'-methylenediphenylene diisocyanate in major part, with a multidisperse polyol blend having an average unsaturation of less than about 0.010 meq/g and a polydispersity of greater than 1.4, comprising:

two or more individual polyoxypropylene polyols, each of said individual polyoxypropylene polyols being a substantially monodisperse polyol having an unsaturation of less than about 0.015 meq/g and an average molecular weight of from about 1000 Da to about 20,000 Da, at least one of said two or more individual polyoxypropylene polyols comprising a polyoxypropylene polyol containing from about 1 weight percent to about 20 weight percent random, internal oxyethylene moieties.

15. A polyurethane elastomer exhibiting less than 5 weight percent water absorption at 0° C., comprising the reaction product of:

a) an isocyanate terminated prepolymer having an NCO content of from 3 to about 25 weight percent and prepared by reaction of a diisocyanate component comprising 4,4'-methylenediphenylene diisocyanate in major part with a polyoxypropylene polyol component comprising in major part one or more polyoxypropylene diols having a molecular weight of from 500 Da to 20,000 Da, an unsaturation of 0.007 meq/g or less, an internal random oxyethylene content of from about 3 to about 12 weight percent and not more than about 20 weight percent total oxyethylene groups; with b) 1,4-butanediol at an index of from 70 to 130; in the presence of c) an effective amount of a urethane promoting catalyst.

16. The elastomer of claim 15, wherein said reaction product is further the reaction product of 0.1 to about 1.0 weight percent water relative to the amounts of a) and b).

* * * * *